United States Patent [19]

Randelman et al.

[11] Patent Number: 5,072,380

[45] Date of Patent: Dec. 10, 1991

[54] AUTOMATIC VEHICLE RECOGNITION AND CUSTOMER BILLING SYSTEM

[75] Inventors: Robert E. Randelman, Bethlehem, Pa.; Ronald R. Chance, Annandale, N.J.

[73] Assignee: Exxon Research and Engineering Company, Florham Park, N.J.

[21] Appl. No.: 536,820

[22] Filed: Jun. 12, 1990

[51] Int. Cl.$^5$ .............................................. G06F 15/21

[52] U.S. Cl. .................................... 364/406; 364/401; 235/383; 235/384

[58] Field of Search ................ 340/928; 235/383, 384; 364/401, 406; 455/604

[56] References Cited

U.S. PATENT DOCUMENTS

| | | | |
|---|---|---|---|
| 3,602,881 | 8/1971 | Bayne | 340/928 |
| 3,639,894 | 2/1972 | Tanaka | 340/938 |
| 3,641,569 | 2/1972 | Bushnell et al. | 340/936 X |
| 4,303,904 | 12/1981 | Chasek | 235/384 |
| 4,325,146 | 4/1982 | Lennington | 455/604 |
| 4,338,587 | 7/1982 | Chiapetti | 340/928 |
| 4,398,172 | 8/1983 | Carroll et al. | 340/942 |
| 4,555,618 | 11/1985 | Riskin | 235/384 |
| 4,862,162 | 8/1989 | Duley | 340/938 |
| 4,916,296 | 4/1990 | Streck | 235/454 |
| 4,932,049 | 6/1990 | Lee | 379/60 |
| 4,937,581 | 6/1990 | Baldwin et al. | 342/44 |

FOREIGN PATENT DOCUMENTS

| | | | |
|---|---|---|---|
| 0048786 | 4/1977 | Japan | 340/938 |
| 0222369 | 12/1983 | Japan | 235/384 |
| 0006160 | 1/1984 | Japan | 364/401 |
| 0159526 | 7/1987 | Japan . | |
| 0288399 | 11/1988 | Japan . | |
| 0259484 | 10/1989 | Japan . | |

*Primary Examiner*—Dale M. Shaw
*Assistant Examiner*—David Huntley
*Attorney, Agent, or Firm*—Ronald D. Hantman

[57] ABSTRACT

The present invention is a system and method for identifying a vehicle in a prescribed area of a service station and associating services with the vehicle. Each vehicle includes a transponder. Communication between the transponder and the service stations is via radio frequency signals.

18 Claims, 4 Drawing Sheets

AUTOMATIC VEHICLE RECOGNITION AND CUSTOMER BILLING SYSTEM

BACKGROUND

The invention relates to a system and method for identifying a vehicle moving in a prescribed area. In particular, the present invention is a system to automatically recognize vehicles and correlate purchased products and services with customers of service stations, convenience stores or other similar establishments. In addition, other vehicle or customer information can be transferred to inform, track or notify both customers and providers.

There are many instances when vehicle information is required rather than operator information. These may include situations such as: notifying individuals of vehicle maintenance; providing the customer with vehicle information or promotions during fuel filling; build upon customer or vehicle recognition, tracking or notification; provide alternatives for credit/debit card billing, especially for fleet billing; and provide records of service or maintenance for a specific car.

SUMMARY OF THE INVENTION

The present invention is a system and method for identifying a vehicle in a prescribed area. The system includes an antennae which emits an electromagnetic field at a predetermined frequency. This field energizes an emitter (card) affixed to a vehicle in the vicinity of the antennae. The emitter responds by sending out an encoded electromagnetic signal. The system includes a controller which performs two functions. These functions may be performed by separate units or combined into one electronic unit. One function is to regulate the power and frequency of the antennae. The other function is to detect the signal by the emitter and convert it into a data stream in the computer. Electronic equipment that identifies vehicles is well known in the art, see e.g. U.S. Pat. No. 4,782,342 and U.S. Pat. No. 4,888,474. In addition, the controller may relay the information back to the card where it may be stored for later transmission. In this capacity, the card serves as a transponder. The computer then utilizes the data stream along with accounting or billing information and stores the data for later use.

The method of the present invention allows for automatically recognizing and servicing a vehicle and invoicing the vehicle owner which may be an organization such as a company or government entity, e.g., school district (hereinafter referred to as a vehicle owner). The method includes the steps of determining whether an approaching vehicle is stopping for service electronically from an emitter fixed to said vehicle, identifying said vehicle electronically from said emitter as it enters a service area in order to associate it with records in a file, database, or other computer storage device, preventing any other electronic identification from other nearby service areas from providing services to said vehicle, informing the operator of said vehicle of the costs incurred of said vehicle, transferring data representing the costs or types of said services provided to said records in said file, determining whether services are authorized for said vehicle by identifying said vehicle electronically a second time so as to verify that it is the same vehicle identified earlier, and assembling all costs for services, or types of service information in said record for a given billing period.

DESCRIPTION OF PREFERRED EMBODIMENT

Figure 1:
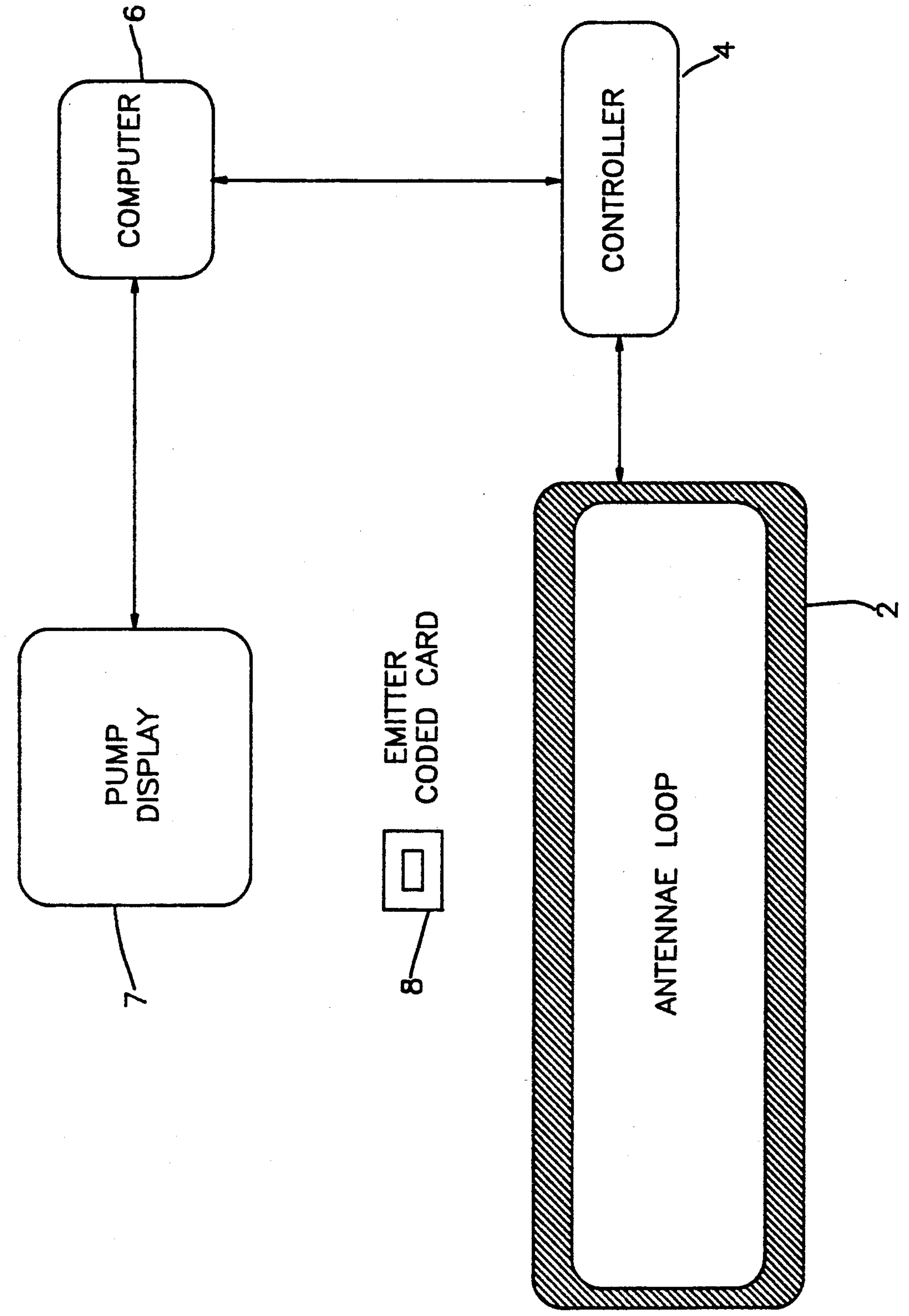
FIG. 1 shows a schematic embodiment of the components of the system.

FIG. 1 shows the components of one embodiment of the system. The system includes a number of components: an antennae (2) which outputs a predetermined radio frequency; an electronic box, termed "controller" (4) which controls the antennae output and translates a received signal on yet another predetermined frequency into a data bit stream; and a computer (6) which receives the data bit stream from the controller and in turn utilizes the received data. Finally an electronic device consisting of an inductor loop and integrated circuit package, termed a "card" (8) which stores information and transmits said information when activated by the radio frequency of the antennae.

Figure 2:
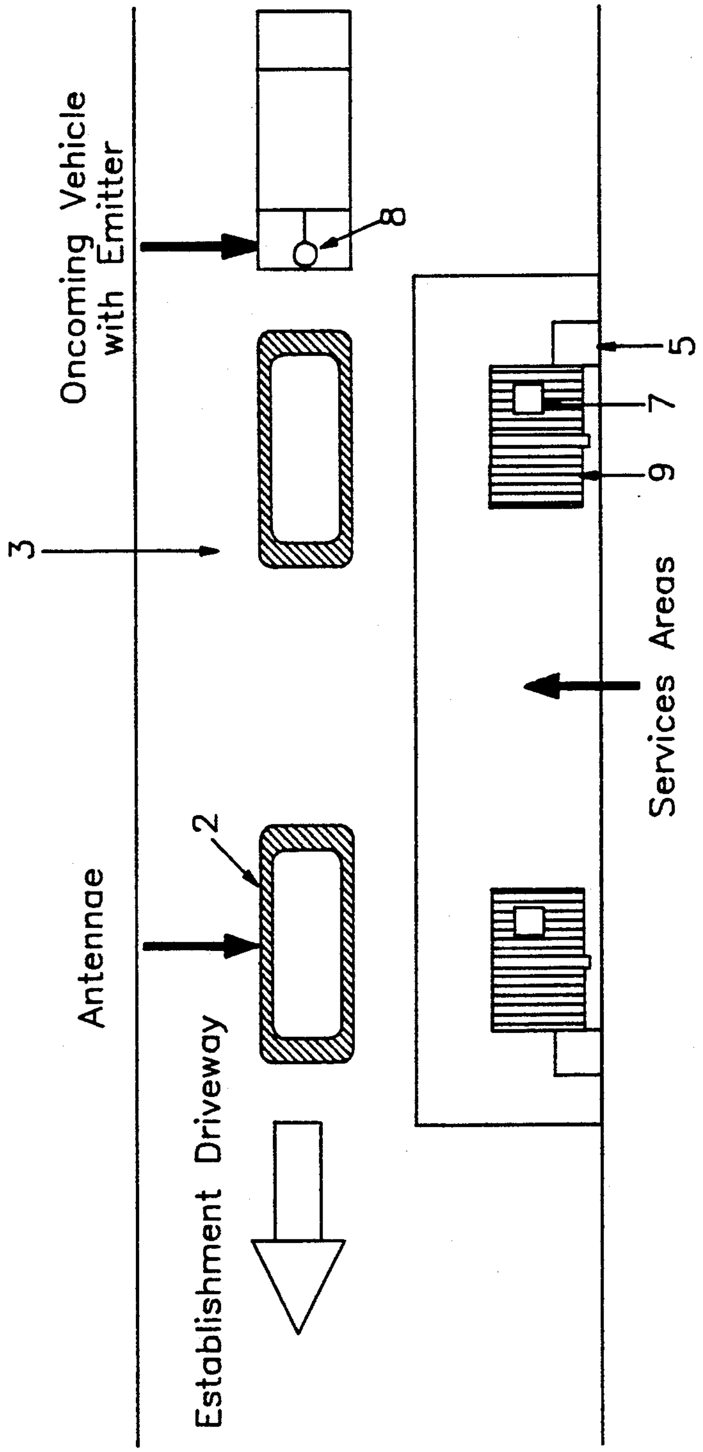
FIG. 2 shows a description of a preferred embodiment of the system.

FIG. 2 shows one configuration of the system in which an antennae (2), being a loop, rod or other radio frequency emitting/receiving device, is embedded in the proximity of the gasoline dispensing pump or area (3). The service pump area is used for illustration only and any service area may be used in the present invention. Other areas considered to be service areas include a pump area, bay service area, vending or convenience store area, or any other area within the confines of the station property. This antennae (2) is connected to an electronics box, termed a controller (4), that controls the radio frequency (RF) output signal and detects an RF input signal. The controller then translates the RF input signal into a computer data stream format. The controller may be located in a housing (5) near the antennae. For example, the housing (5) may be fixed to a support or an overhead canopy. The system may also include a display screen (7) atop or in the vicinity of the pump (9).

The antennae is always energized and therefore produces an electromagnetic (EM) field in the fueling area. In addition, there is a means of detecting the direction of a vehicle as it approaches the fueling area by using a secondary antennae, computer software and/or hardware. The EM field is in the radio frequency band and is chosen so as to minimize interference from other electronic or RF sources, such as vehicle ignition systems, lighting, or other RF generating sources. In addition, the broadcast band must conform to all applicable legal specifications such as frequency, power, licensing and bandwidth.

Placed on a vehicle is a device including an integrated circuit component and a RF coil. This device, termed a "card" (8), is activated when it crosses the EM field provided by the antennae. Circuitry on the card prevents energizing in the presence of a "false" or stray field. Upon activation, the card emits an EM radio frequency pulse or "broadcast" which is then received and decoded by the controller into a data bit stream. Some method of discriminating interfering pulses from those emitted from the card is provided.

The data bit stream decoded from the radio frequency pulse is then transferred either electronically or optically to a computer, which may be included in the same housing (5) with the controller, where the data is stored and utilized. In addition, the computer may relay back a data stream to the controller, which in turn broadcasts this information back to the card through the antennae system. The card receives the broadcast and likewise stores the information internally for later usage.

The data bit stream recovered from the card can be utilized in a number of ways, which include, for example, customer accounting, billing, recognition, tracking or promotion. Subsequently vehicle identity, tracking, security, service or maintenance logging and notification may also be accomplished. Vehicle identification is a major difference between the described system and the current use of a credit or debit card. Whereas a credit or debit card identifies a particular individual customer, the present invention is a system which identifies a particular vehicle irrespective of the vehicle operator In addition, the information from the data bit stream may be used along with information stored in the computer as a basis for other sensor technologies where vehicle or customer information is required, such as vehicle maintenance alerts, recalls, and specification attainment.

Figure 3:
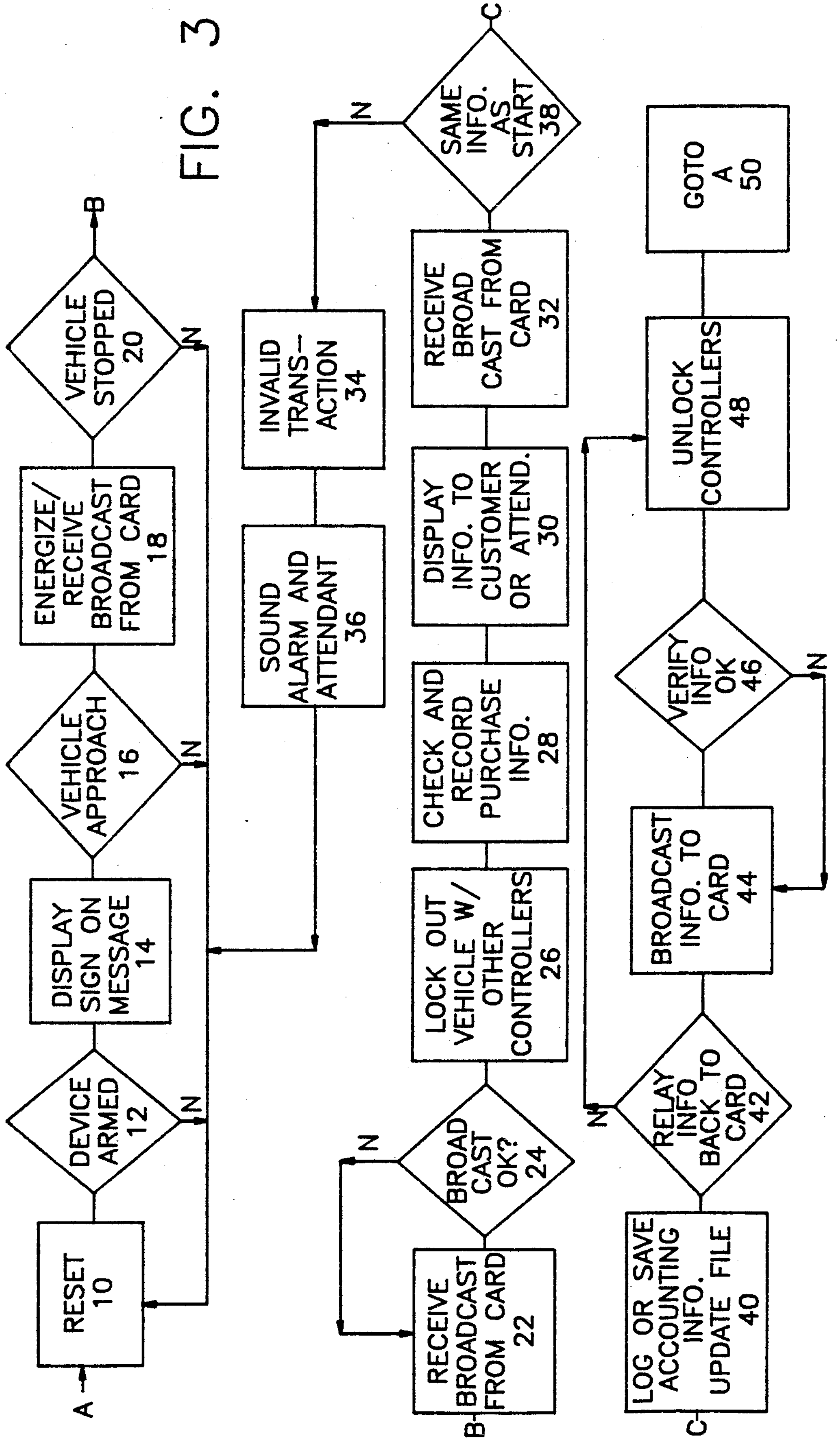
FIG. 3 shows a flow diagram of one embodiment method used to detect vehicles and automatically capture and utilize billing information.

FIG. 3 depicts the flowchart of the method used to perform the previously mentioned embodiment in which a car is identified, the customer is informed, and information is relayed back to the card on the vehicle.

The method starts with a reset operation (10) in which the loop and controller are cleared of any fault condition and readied for activation. This reset operation may include loading computer files, updating said files or records within those files, setting electronic or other indicating devices to zero or a previously determined initial state. Any communication links between the various elements of the system are reset and, if needed, initialized. This reset operation can be thought of as setting all elements of the system to their nominal operating state. After the completion of the reset operation the system is considered to be ready for operation. A query (12) determines whether or not the device is armed, the term "armed" being defined as the state in which the device and all associated supporting computer devices are ready to receive, transmit, store and/or analyze data; and are controlling the antennae system properly. If this state is logically "False" or for simplicity "NO", then the system is reset (10); if this is state is logically "True"or for simplicity "YES", then display a sign on message (14) and wait for approaching vehicle. At this point the system is armed and considered in a "READY" state. The next operation is to query if a vehicle approaches (16). If NO then reset the system (10); if YES, then energize and receive information from card on the vehicle (18). This step entails waiting for the vehicle card to energize and transmit the previously stored information contained on said card. The next step (20) is to query and determine if indeed the vehicle has stopped moving. This could be done in a variety of ways, however one way would be to continuously receive the same broadcast for the vehicle tag a set number of times, say five. Another way would be to measure the signal strength of the broadcast until it has reached an equilibrium value for a set period of time. This query would account for those customers who are merely driving through the service or fueling area and do not intend to receive fuel products or service. If vehicle is not stopped, i.e., "NO" then reset the system (10); if "YES", then re-receive a broadcast from the vehicle (22). This operation receives the card information and stores said information. The next operation (24) is to query whether or not the broadcast is translated properly into a data bit stream. If "NO", then the broadcast is rereceived (22); if "YES", then the data bit stream is stored for later use as a validation point and the capture of the identity or other recognition information is prevented by the other controllers or computers in the area. This operation is termed "Vehicle Lock Out" (26). In a sense, this alerts the other controllers and computers in this, and other adjacent service areas, that an operation is pending on a vehicle and they are not to recognize it.

At this point a vehicle has been recognized and would now be ready to obtain services. The next operation would be to dispense or administer products and or services and record that information (28). While services are being administered, information may be sent to a customer display (30). It should be noted that this operation (30) may take place during or after any proceeding or succeeding steps. This step is described here as only an illustration. Next the card is interrogated and a broadcast is re-received (32). The broadcast may be received continuously from step (22) through (32) until services are ceased, for simplicity (32) is termed "a second time." It is assumed that this broadcast is received successfully and understood that if this is not the case, then the card will be interrogated until such a time that a suitable broadcast is received that can be translated into a data bit stream. This data bit stream is then stored as the second validation point. The next operation (38) queries if the first validation point obtained at (22) is identical to the second validation point obtained at (32). In addition, cross checking or otherwise validating credit or other billing information may be performed. This may include verifying authorized operators. If "NO", the validation points do not match and this transaction is considered invalid (34). An alert (36), such as an alarm, is sounded so that an attendant or other employee or supervisor may be notified. In this case of an invalid transaction, manual recording or intervention may be required. After this alarm or alert, which may have to be cleared or otherwise acknowledged by an attendant or employee, the system is then reset (10). If the query (38) is "YES" then the vehicle is considered authorized, the transaction valid and accounting or other business or statistical data, which may include customer preferences and/or services rendered, are logged (40). This logging operation may entail updating customer records, writing appropriate receipts, updating database files and/or transmitting information to other computers. Details of this operation are provided in FIG. 4.

The next operation (42) queries if information would like to be relayed back to the card. This information may be service records or history, accounting, customer preference, or other information which one would want to be associated with a vehicle rather than to an individual.

If this query is "NO", that is that no relay information is to be sent, then the next operation would be unlocking the controllers (48) described below.

If this query is "YES" then the information is formulated in a computer, translated into an appropriate data bit stream code, which may be encoded in any fashion, and then broadcasted to the card. The card receives the broadcast, likewise translates said broadcast into a data bit stream and stores said data bit stream electronically within the card's electronic package. This operation is termed "relaying" and is depicted as operation (44) on FIG. 3. The next operation (46) queries if this relayed information is received properly. This operation entails having the card to broadcast the stored information and the data bit stream resulting from this broadcast is compared to the data bit stream formulated in operation (44). If query (46) is "NO" then the data bit stream is rebroadcasted to the card (44). If this query is "YES" then this information has been stored onto the card correctly and the next operation may proceed.

The next operation (48) is to unlock the controllers and in so doing alert the other computers that a transaction is completed with this identified vehicle. Information about the transaction may be transferred to the other controllers, computers or other devices that may analyze, store, or otherwise use the transaction information. These computers are not limited to those associated with a particular service facility, but may in fact be a computer network or supervisory computer located at another location. This procedure (48) so described is the enabling analog of the disabling operation of "lock-out" described as (26).

The transaction/information gathering cycle is now considered complete and as a final operation (50) the system is driven into a reset condition (10).

Figure 4:
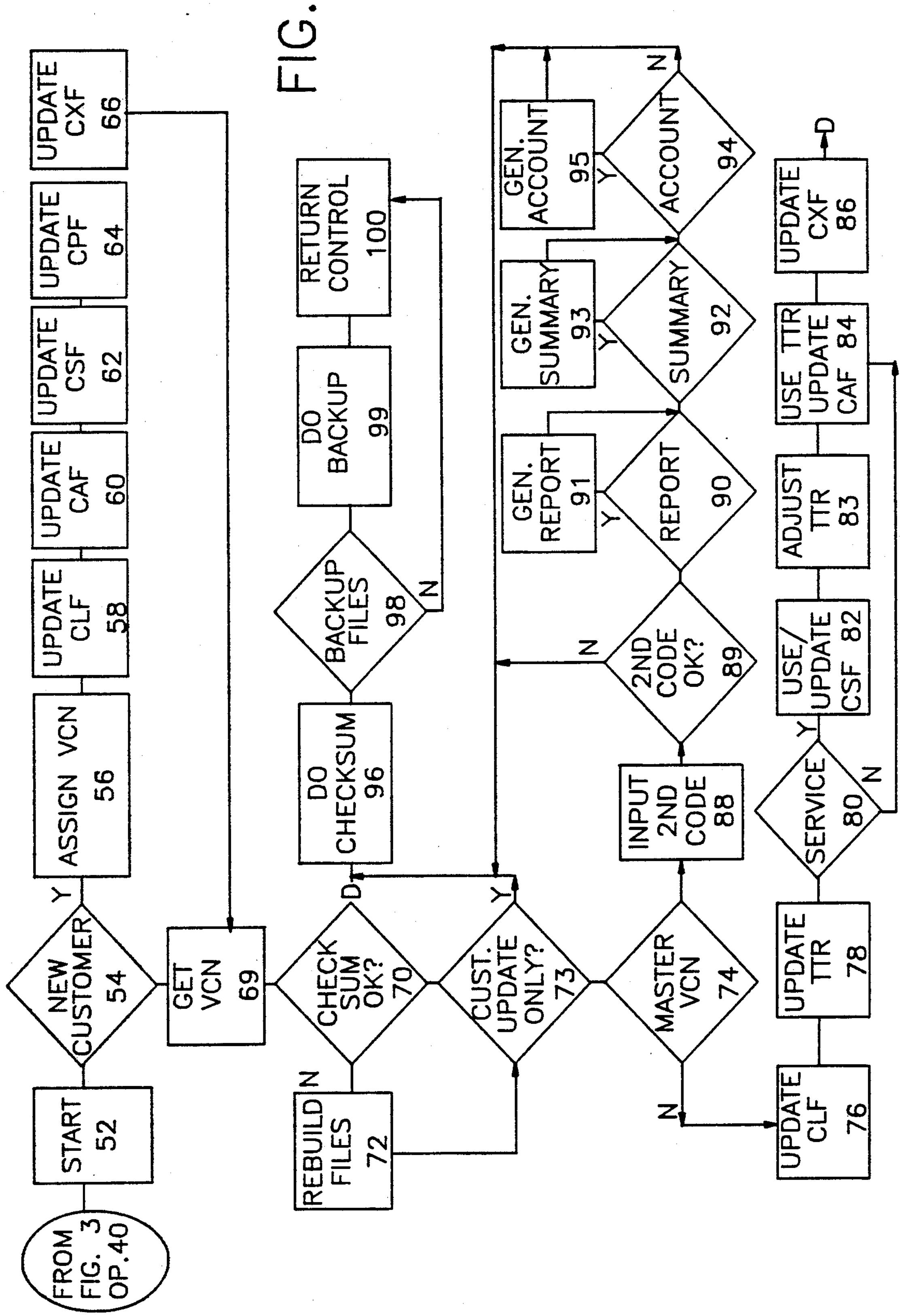
FIG. 4 shows the flow diagram of the method of updating customer records, generating reports and summaries.

FIG. 4 depicts the flowchart of the method used to initialize and log customer records. For the initialization operation, which may include re-initialization of an existing customer, the required data files are set up as described from (52) through (69). The return step (100) would then be a system reset (10).

In the normal operating mode in which customer files already exist, the method in FIG. 4 normally operates after (40). At the START (52) various data are passed from the main. This information is the emitter code information, customer log information, change flag value (CFLG), and transaction information. The method begins with a query (54) if this is a new customer. A new customer or an established customer who requests changes in the the components of the various files are signified by a CLFG>0. If "YES" then assign a vehicle code number (VCN) in operation (56). The VCN may be the manufacturer's vehicle identification number (VIN) or another number that uniquely describes a particular vehicle. If CLFG>0 and a VCN is passed, then this signifies an existing customer who wishes their records or files, as described below, changed or updated. The term "updating" here refers to altering, creating or appending records or files that are associated with a particular vehicle or customer. Next the customer log file (CLF) is updated (58). The CLF stores the various activities such as purchasing fuel or services and the station, date and time. Next the customer accounting file (CAF) is updated with the new customer record (60). The accounting record contains all data needed for accounting purposes such as billing address, discounts, and authorized purchases or products. The next operation is updating the customer service file (CSF) in operation (62). The CSF contains the service records of work done on an identified vehicle such as last service dates, service records, service items, or maintenance schedules. The next file (64) that is updated for the new customer is the customer preference file (CPF). The CPF stores the customer desired information. This may include various customer preferred product choices, service appointment times, accounting or method of payment choices. The last file updated for a new customer in operation (66) is the customer cross reference file (CXF). The CXF provides a "lookup table" between the VCN, CLF, CAF, CSF, and CPF to simplify sorting, record addition or deletion, and report generation. At the conclusion of operation (66) a customer is fully integrated into the system and the process then continues.

If the query (54) of a new customer is "NO" then the next operation is to obtain the VCN from the emitter information (69). Note that this operation is also the entry point to update the files to record a transaction. A query (70) tests if the CXF matches the checksums for the VCN, CLF, CAF, CSF, and CPF. The checksums test identifies if the file structure system is still intact and has not been corrupted or altered in any way. If "NO", that is the files are corrupted, then the method proceeds to operation (72) in which the files are rebuilt from a backup set on other means for correcting the corruption. If the query (70) is "YES" then the method proceeds through a sequence of operations that record the components of a transaction. While one order of recording is described here, there are other methodologies and this described method is for illustration only. The overall aspect of the next sequence from (74–100) is that all transactions and operations are recorded in these sequences. Query (73) tests if this is a customer record information change only. If "YES" then continue to (96) which will yield a return (100), if "NO" then continue.

Operation (74) queries if the Master VCN has been passed at (52). The Master VCN can be thought of as a "security code" that would enable authorized personnel to obtain summary, report, or other compiled or individual transaction activity reports. The Master VCN is not necessarily derived from a physical emitter or card, though it could be, but may be a code that is manually introduced. If Query (74) is "NO" than it is assumed that this transaction is a customer transaction. The next operation (76) is to update the CLF with the appropriate information. Next, the product purchase information is stored on a temporary file called the Temporary Transaction Record (TTR) (78). This operation is also done at FIG. 3, operation (28). Next a query (80) determines if service was performed on the vehicle. If "YES", then the CSF is updated (82) and the service accounting information is added to the TTR (83). If "NO" then the method proceeds to (84) where the TTR is written on the CAF to update that file for the completed transaction. The next operation (86) is to update the CXF of the changes made.

If the query in (74) is "YES", that is that the master VCN has been passed, then a second security code is requested (88). The next operation (89) queries if the second security code is validated. If "NO" then the operation proceeds to (100) to return. If "YES" then a query (90) determines if a report is to generated. If "YES" then that report is generated (91). This report is a general summary of all transactions. If "NO" then the operation proceeds to another query (92) whether a summary report is requested. If "YES" then a summary report is generated (93). This report is similar to a general report, though it covers specified customers, times or other qualifying conditions. If "NO" then the next operation is to query if an accounting summary is to be generated (94). If "YES" then an accounting report is generated (95). This accounting report might be a billing report, accounting summary report, or other such report for accounting or billing purposes. If "NO" then the next operation is (96).

Operation (96) follows operations (95), (94), (89), (86), or (73) and is described as the "Close-Out". Operation (96) updates the various checksum or file corruption detection methods. The next operation queries if a backup of the files should be made (98). Backups may be made after any specified time period, generally daily or weekly. The decision for the result of this query may be made manually or automatically. If query (98) is "YES" then operation (99) performs this data backup and may transmit information to the controller computers [(4) in FIG. 1.]. The final operation of the sequence is (100), RETURNS, which returns operation back to the main operational sequence, (40) of FIG. 3.

The present invention may include a number of features. For example, one embodiment may include a display screen (7) as described in operation (30) of FIG. 3. The screen may be part of the dispensing pump (9) (see FIG. 2) or enclosed in a separate housing nearby or on the pump (9). When the card information is received, the computer would transmit information to the display for notifying the vehicle operator. This information may be promotional in nature or describe information relating to that particular vehicle, customer records or accounts.

In the preferred embodiment, the data stream is used for automated customer billing, such as fleet billing, local customer accounting or as a replacement or auxiliary to charge or debit cards. Here, fuel or service purchases would be recorded by communicating to the computer a log with the customer vehicle identity. In this way a record of vehicle fuel, product, or services could be stored for later billing or accounting use. Therefore, the purchases are associated with a vehicle rather that an individual vehicle operator. This is very important where purchases are to be billed against a fleet or group of vehicles rather then those persons who utilize the vehicles.

In another embodiment, vehicle information is provided to other sensors or devices within the service or fueling area. These devices may require information such as customer preferences, vehicle manufacturing specification data or servicing information to preform other services to the vehicle or provide the vehicle operator with vehicle specific information.

What is claimed is:

1. A system for automatically recognizing and servicing a vehicle at a service station and billing the vehicle owner comprising:

a) means for determining whether an approaching vehicle is stopping for service electronically,
b) means for identifying said vehicle electronically with radio frequency signals as it enters a service area in order to associate it with records in file, database, or other computer storage device,
c) electronic means for informing the operator of said vehicle of promotional, diagnostic, or vehicle service information,
d) means for preventing any other electronic identification from other nearby service areas,
means for providing services to said vehicle,
f) means for determining whether services are authorized for said vehicle by reidentifying said vehicle electronically so as to verify that it is the same vehicle identified earlier.
g) means for informing the operator of said vehicle of the costs incurred of said vehicle.
h) means for transferring data representing the costs or types of said services provided to said records in said file,
i) means for assembling all costs for services, or types of service information in said record for a given billing period and invoicing said costs to said vehicle owner.

2. The system of claim 1 wherein said determining means of a) and said identifying means of b) include an antennae for emitting an electromagnetic field of a predetermined frequency, an emitter (card) affixed to said vehicle which emits an encoded signal in response to said predetermined frequency, and a detector means (controller) for receiving said encoded signal and converting the encoded signal into a data stream.

3. The system of claim 2 further comprising a means for relaying information back to said emitter for storage for later retrieval.

4. The system of claim 2 wherein said antennae is in close proximity to the service area of a service station.

5. The system of claim 4 wherein said antennae is embedded in the roadway of said service area.

6. The system of claim 2 wherein said antennae is in the canopy or overhead of said service area.

7. The system of claim 2 wherein said card includes a power supply.

8. The system of claim 2 wherein said antennae is in the shape of a loop.

9. The system of claim 2 wherein said antennae is in the shape of a rod.

10. A method for automatically recognizing and servicing a vehicle at a service station and billing the vehicle owner comprising:

a) determining whether an approaching vehicle is stopping for service electronically,
b) identifying said vehicle electronically as it enters a service area in order to associate it with records in a file, database, or other computer storage devices,
c) informing the operator of said vehicle of promotional, diagnostic, or vehicle service information.
d) preventing any other electronic identification from other nearby service areas,
e) providing services to said vehicle,
f) determining if the customer has an account or is authorized to purchase,
g) informing the operator of said vehicle of the costs incurred of said vehicle,
h) transferring data representing the costs or types of said services provided to said records in said file,
i) assembling all costs for services, or types of service information in said record for given billing period and invoicing said costs to said vehicle owner.

11. The method of claim 10 further comprising the step of determining whether services are authorized for said vehicle by re-identifying said vehicle electronically so as to verify that it is the same vehicle identified earlier.

12. The method of claim 10, in which a transponder is fixed to said vehicle, further comprising the step of:

a) relaying information back to said transponder for storage for later retrieval.

13. The method of claim 10 further comprising the step of determining if the file structure has not been altered or corrupted.

14. The method of claim 10 further comprising the step of storing copies of said files for later use.

15. The method of claim 10 further comprising the step of providing transaction activity reports.

16. The method of claim 15 wherein said transaction activity report is a general report including a general summary of all transactions.

17. The method of claim 15 wherein said transaction activity report is a general summary report including a general report limited to specified customers, times, or other qualifying conditions.

18. The method of claim 15 wherein said transaction activity report is a general accounting report including information specific to accounting or billing purposes.

* * * * *